United States Patent [19]

Dubroc, Sr.

[11] 4,176,771

[45] Dec. 4, 1979

[54] CARRIER FOR THREE-WHEEL MOTORCYCLE

[76] Inventor: Tyrone P. Dubroc, Sr., 4583 Little Farms Dr., Zachary, La. 70791

[21] Appl. No.: 867,901

[22] Filed: Jan. 9, 1978

[51] Int. Cl.² .............................................. B62J 7/04
[52] U.S. Cl. .................................. 224/39; 224/32 A; 280/289 A; 280/289 G
[58] Field of Search ............... 224/31, 39 R, 37, 32 R, 224/32 A, 30 R, 40, 41, 38; 280/289 G, 289 R, 202, 756, 289 A

[56] References Cited

U.S. PATENT DOCUMENTS

| 1,473,956 | 11/1923 | Eyre et al. | 280/289 G |
| 2,109,315 | 2/1938 | Harley | 224/39 R X |
| 2,850,221 | 9/1958 | Brechwald | 224/39 R X |

FOREIGN PATENT DOCUMENTS 696132  8/1940  Fed. Rep. of Germany ........... 280/202

574635  3/1958  Italy ......................................... 280/202

OTHER PUBLICATIONS

Luggage Carrier (publication) 2/21/1961.

*Primary Examiner*—Robert J. Spar
*Assistant Examiner*—Jerold M. Forsberg
*Attorney, Agent, or Firm*—E. Donald Mays

[57] ABSTRACT

A carrier assembly or rack for use on a three-wheel motorcycle, particularly on a three-wheel, all-terrain vehicle.

The carrier includes a pair of leg members having one end attached to the foot rests and the other end attached to a generally U-shaped article support section with a pair of spaced side members having support means extending between them. A brace means is attached to the upper part of the motorcycle frame and also to one or more points of the article support means.

9 Claims, 5 Drawing Figures

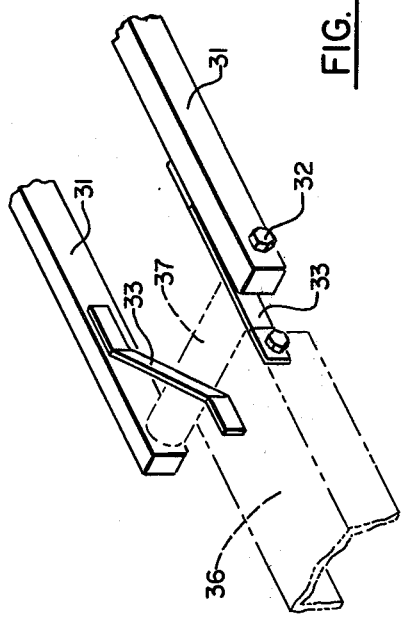
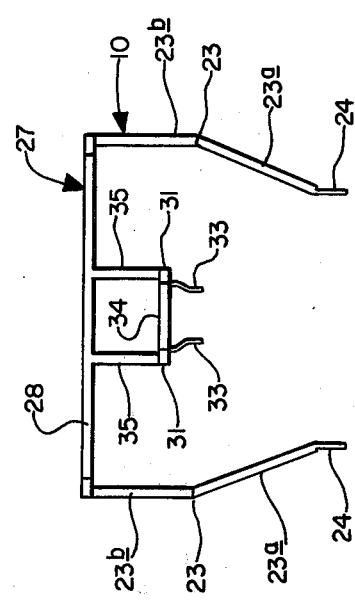
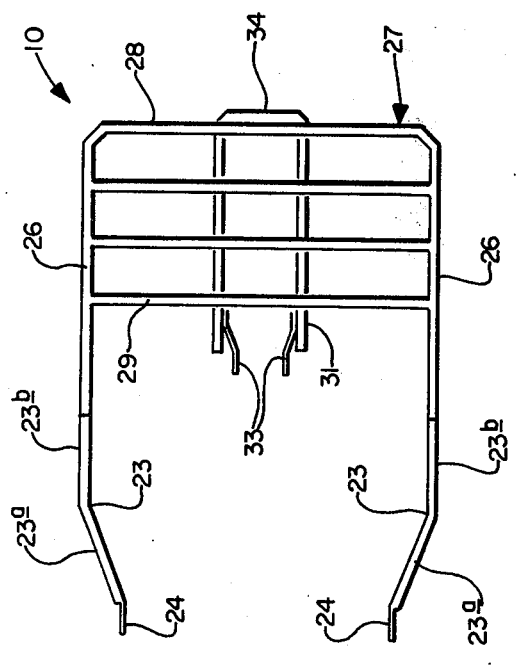
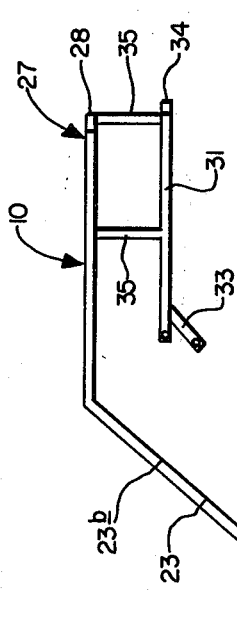

CARRIER FOR THREE-WHEEL MOTORCYCLE

BACKGROUND OF THE INVENTION

While three-wheel motorcycles have been commercially available for some time, their principal use has been generally the same as for conventional two-wheel motorcycles. Generally, they have been used primarily for transporting a driver and a passenger on streets and highways. These motorcycles are not generally suitable for use in fields or wooded areas because their small diameter tires can become easily mired in muddy terrain.

Recently there has become available three-wheel motorcycles made especially for off-road and highway use. These motorcycles are equipped with extra large width, low pressure tires so that they can readily support their own and the passengers' weight in very muddy, soft or sandy terrain without becoming stuck. Thus, these motorcycles can easily cross very rugged or muddy open fields, hills, or heavily wooded even or uneven terrain.

One of the principal uses made of the so-called All Terrain Vehicles (ATV's) or three-wheel motorcycles is on camping or hunting trips. In either or both of these uses, it is very desirable or, in fact, necessary to transport camping equipment to the camping site and to bring the game, such as deer, back from the woods. Unfortunately, most of the available three-wheel, all-terrain motorcycles do not provide any carrier for transporting camping equipment and/or game into and out of the camping and/or hunting site.

In addition to the need for a carrier for articles on these vehicles, they also suffer from other disadvantages. In traveling through heavy underbrush, the riders' legs are exposed to thorn and briar bushes and vines while underway. Also, when climbing steep terrain, even though these vehicles have a low center of gravity, it is possible to turn them over sideways or tip them over backwards. Additionally, some models have an integrally formed fiberglass rear wheel cover-seat-shroud assembly which is easily broken if the rear of the vehicle hits a tree, rock or other obstacle.

Thus, it can be seen that there is a genuine need for a rugged, strong carrier suitable for mounting on the rear of present three-wheel, all-terrain motorcycles. Such a carrier is needed for both the transport of camping and hunting equipment and game and also to provide an added degree of protection to the rider when traveling over bushy or steep sloping terrain.

SUMMARY OF THE INENTION

It is an object of the present invention to provide a carrier for a three-wheel motorcycle that provides a rugged frame to support camping equipment and/or game.

It is another object of the present invention to provide a carrier for a three-wheel motorcycle that can be readily fabricated from economical materials and easily attached to the vehicle.

It is still another object of the present invention to provide a carrier for a three-wheel motorcycle that protects the rider from injury and the vehicle from damage when traveling through rugged and uneven terrain.

The foregoing and other objects of the present invention are achieved in a carrier assembly for attachment to the frame of a three-wheel motorcycle which includes a pair of opposed, spaced apart, upwardly extending leg members. The lower ends of the leg members are adapted for coupling to a lower portion of the motorcycle frame intermediate the front and rear wheels. A generally U-shaped article support section having a pair of spaced apart side members is attached to the upper end of the leg members and extends horizontally to the rear of the motorcycle and has article support means extending between the side members. Brace means are attached to the upper part of the frame at one of its ends and at one or more points to the U-shaped article support section.

DESCRIPTION OF THE DRAWINGS

FIG. 2 is a top plan view of a carrier assembly of the present invention;

FIG. 3 is a side elevational view of a carrier assembly of the present invention;

FIG. 4 is a rear elevational view of a carrier assembly of the present invention; and FIG. 5 is an enlarged, broken, perspective view of the brace attachment to the motorcycle.

DESCRIPTION OF THE PREFERRED EMBODIMENT

Figure 1:
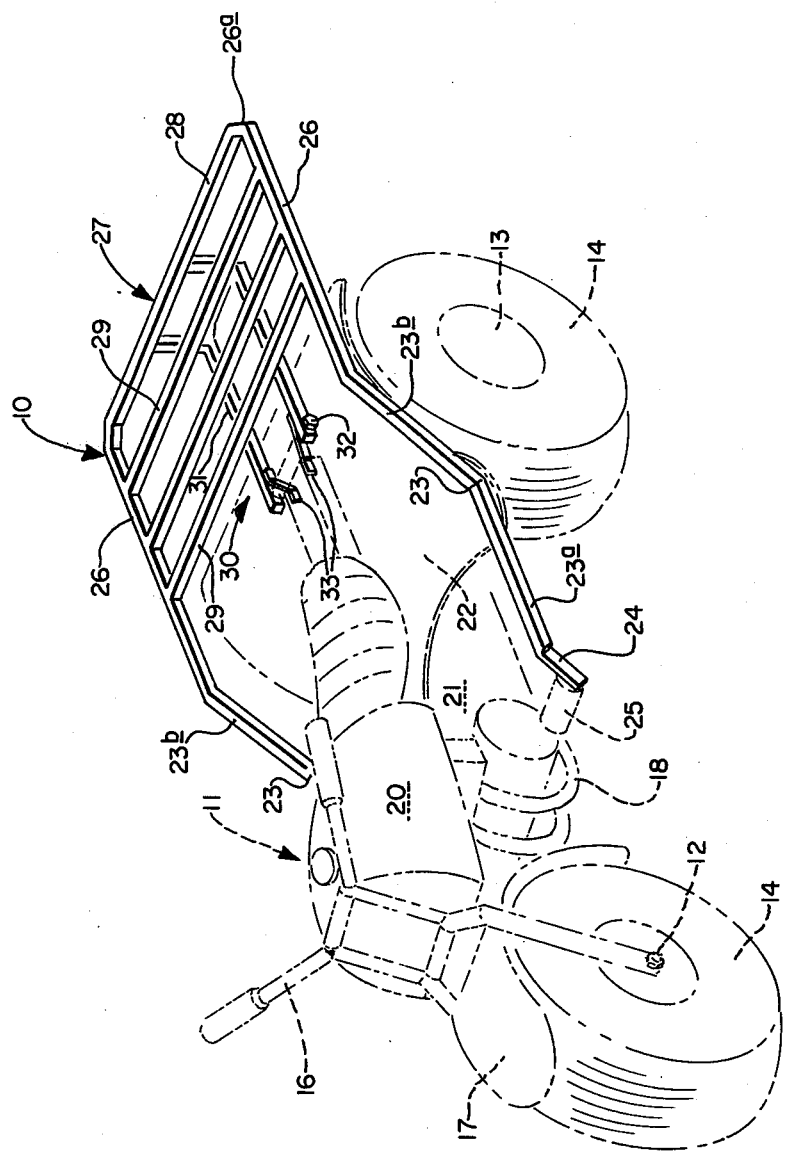
FIG. 1 is a perspective view of a carrier assembly of the present invention attached to a three-wheel motorcycle (shown in phantom)

As seen in FIG. 1, the carrier assembly of the present invention, designated generally by the numeral 10, is attached to and projects to the rear of a three-wheel motorcycle, designated generally by the numeral 11. While the carrier assembly of the present invention is adapted for use on any number of three-wheel motorcycles, the motorcycle depicted in FIG. 1 in phantom is a Honda All Terrain Cycle (90 cc. engine). The motorcycle is equipped with a front steering wheel 12 and two rear wheels 13 (only one of which is shown) all of which carry large, low pressure tires 14 which have a wide tread that prevents the motorcycle from getting stuck or mired down in muddy or sandy terrain. The front steering wheel support yoke 15 has attached thereto handlebars 16 and a front fender 17. The front and rear wheels are mounted on a main frame, only a central lower portion 18 and a rear upper portion 19 being shown. The frame supports the gas tank 20 and engine 21. The frame also supports the integral seat-shroud member 22 which serves also as the rear fenders for the motorcycle. The seat-shroud member 22 snaps on and off the motorcycle frame for easy access to the engine and rear transmission of the motorcycle.

Referring now to FIGS. 1 through 4 of the drawings, the carrier assembly 10 of the present invention in the embodiment illustrated includes a pair of upwardly and rearwardly extending, opposed, spaced apart leg members 23—23. Each leg member includes an outwardly and upwardly inclined lower portion 23a and an upwardly inclined upper portion 23b. The lower portion 23a of each leg member terminates in a bracket 24 that is attached by a bolt to the foot rest 25, which is, in turn, attached to the lower central portion 18 of the motorcycle frame.

The upper ends of leg members 23—23 are attached to or integrally formed with the opposed, rearwardly extending side members 26—26 of the generally U-shaped support section, designated generally by the numeral 27, of the carrier or rack 10. The U-shaped support section 27 includes a transverse rear or bottom cross member 28 and a plurality of spaced apart, upper cross members 29 extending between and attached to the side members 26—26. The rear or bottom cross member 28 may be integrally formed with the rear or bottom ends 26a of the side members 26—26 or separately formed and attached thereto by welding. The upper cross members 29 are conveniently attached at each of their ends to the side members 26—26 by welding. Instead of separate upper cross members 29, the article support surface of the carrier or rack can be made by attaching semi-rigid, expanded, metal mesh or perforated or solid metal sheeting to the side 26—26 and rear 28 members of the carrier.

As seen in FIGS. 1 and 5, the support section 27 of the carrier or rack is supported above the seat-shroud member 22 by means of a brace structure, designated generally by the numeral 30. The brace structure includes a pair of spaced apart strut members 31—31 having their forward ends attached to the upper rear portion 36 of the frame by means of a bolt 32 or other suitable means received in sleeve 37. If desired, additional strength and rigidity may be provided to the brace structure by attaching brackets 33—33 adjacent the ends of the strut members and bolting their ends to the frame or other suitable anchoring means. As seen more clearly in FIGS. 3 and 4, the strut members are attached at these rear ends by a strut cross member 34 welded thereto or integrally formed therewith. The brace structure also includes four vertical leg members 35 having their lower ends attached to strut members 31—31. Two of the leg members 35 have their upper ends attached to the underside of bottom cross member 27 and the other two leg members have the upper ends attached to the underside of the upper cross members 29, all attachments by welding. The brace structure portion of the carrier or rack provices a means of rigidity supporting the load-carrying portion of the carrier above the seat-shroud member of the motorcycle so that no weight of the carrier or its load is imposed on the shroud structure which in the case of the Honda ATV is made of a fiberglass reinforced plastic which can fracture if any substantial load is placed thereon. Also, the brace structure permits the easy removal and attachment of the seat-shroud structure while the carrier or rack is mounted on the motorcycle.

While the before described brace structure is a preferred design, it is understood that other embodiments may function equally as well. For example, a single strut member may be used instead of two and only one vertical leg member used instead of two. Also, the leg member can be an integral part of the rear portion of the strut member merely by bending it upwardly a sufficient distance to assure that the carrier does not restrict installation and removal of the seat-shroud structure to the motorcycle.

The carrier of the present invention may be formed from any suitable material. One of the preferred materials is rectangular, preferably square, metal tubing. Another preferred material is round metal tubing. The tubing may be of any suitable metal, for example, iron, steel or aluminum or their alloys. If a lighter weight carrier is desired, the tubing can be made from a suitable plastic, such as polyvinyl chloride or ABS. Both of the materials are readily commercially available in the form of pipe or conduit in suitable diameters and wall thicknesses.

The carrier can be fabricated from metal tubing by bending the tubing to form the leg members, side members and rear cross member as a unit from a single piece of tubing. Alternatively, these members may be formed from rectangular tubing by notching and welding to form the necessary bends. The upper cross members can be attached by welding, or using "T" coupling, or bolting to the side members. The brace structure can also be formed by bending or notching and welding the tubing to form an integral structure, or a combination of bending and welding, if desired. The carrier can also be fabricated from solid metal rods by bending, welding, fastening by nuts and bolts, or any combination thereof.

To fabricate the carrier from plastic tubing, the tubing can be shaped by heating and bending to form portions of the carrier and other components can be attached by use of "T" or "L" coupling solvent welded to the pipe sections to complete the carrier.

From the foregoing, there can be seen that the present invention provides an economical, easily constructed carrier for a three-wheel motorcycle that can be readily attached and detached to the vehicle. Further, the carrier of the present invention provides a strong load-carrying platform for carrying camping and hunting gear into rugged terrain having no roads by use of an economical all-terrain motorcycle as opposed to the use of four-wheel-drive vehicles which can only be used where there are existing camping or hunting roads cut through the terrain. Further, the present carrier is highly useful for transporting game such as deer or similar heavy animals after the kill since the ATV's can be usually driven directly to the hunting location. Additionally, the design of the carrier protects the riders' legs and clothing from tears made by briars, thorns and bushes when traveling through heavy underbrush by the leg members 23—23 since the rider's legs are received in the space provided between the leg members and the motorcycle body. Further, the present carrier also protects the rider from injury if he accidentally overturns the vehicle, either by turning on its side or by tipping it backward in rough terrain. The carrier also protects the plastic seat-shroud assembly when used on those ATV's having such a construction.

It is understood that various changes and modifications may be made to the carrier of the present invention without departing from the spirit of the invention which may come within the scope of the claims.

What is claimed is:

1. A carrier assembly for attachment to a motorcycle having a front wheel and two opposed rear wheels, and having a frame and a pair of opposed foot rests fixedly coupled to the lower portion of said frame, said assembly comprising:
   (a) a pair of opposed, spaced apart, upwardly and rearwardly extending leg members, the lower ends thereof being adapted for coupling to said pair of opposed foot rests, said leg members being spaced outwardly of said motorcycle to provide space for the rider's legs therebetween;
   (b) a generally U-shaped article support section having a pair of spaced apart side members attached to the upper ends of said leg members and extending toward the rear of said motorcycle and article support means extending between said side members;
   (c) brace means attached to an upper part of said frame at one of its ends and attached at one or more points to said U-shaped article support section; and (d) said carrier assembly being free of any attachment to the rear wheels of said motorcycle.

2. In the carrier assembly of claim 1 wherein said article support means includes a plurality of cross members extending between said pair of side members.

3. In the carrier assembly of claim 1 wherein said upwardly and rearwardly extending leg members have a lower portion which extends outwardly from said frame and an upper portion extending generally parallel to said frame.

4. In the carrier assembly of claim 2 wherein said brace means includes at least one brace member attached at its forward end directly to a rear portion of said upper part of said frame and at its rear end to the rearmost of said plurality of cross members.

5. In the carrier assembly of claim 4 wherein said brace means include a pair of spaced apart, rearwardly extending brace member components positioned below said article support section and attached thereto by means of at least one pair of spaced apart, upwardly extending brace member components.

6. In the carrier assembly of claim 1 wherein said leg members, U-shaped support section, and said brace means are formed from generally rectangular, tubular metal components.

7. In the carrier assembly of claim 6 wherein said components are assembled into a unitary carrier assembly by welding.

8. In the carrier assembly of claim 1 wherein said leg members, U-shaped support section, and said brace means are formed from generally circular tubular metal components.

9. In the carrier assembly of claim 5 wherein the forward ends of said rearwardly extending brace member components are provided with brackets for attachment to the frame of said motorcycle.

* * * * *